United States Patent [19]
Caldwell

[11] 3,724,583
[45] Apr. 3, 1973

[54] HYDRAULIC MOTOR AND PUMP SYSTEM

[75] Inventor: Alan K. Caldwell, Grand Rapids, Mich.

[73] Assignee: Rewop Company, Kent County, Mich.

[22] Filed: Dec. 28, 1970

[21] Appl. No.: 101,447

[52] U.S. Cl.......180/66 R, 60/19, 60/53 C, 137/493.7, 137/493.8, 137/493.9, 418/31, 418/151
[51] Int. Cl.......B60k 17/10
[58] Field of Search......180/66, 6.48; 60/19, 53 C; 418/31, 16, 259, 151; 137/493.9, 493.8, 493, 493.7

[56] References Cited
UNITED STATES PATENTS

| | | | |
|---|---|---|---|
| 2,418,634 | 4/1947 | Hallerstrom | 137/493.9 X |
| 2,518,578 | 8/1950 | Tomlinson | 180/66 R UX |
| 2,547,578 | 4/1951 | Holmes | 180/66 R |
| 2,598,538 | 5/1952 | Haynes | 180/66 R X |
| 3,256,950 | 6/1966 | De Biasi | 180/66 R X |
| 3,422,917 | 1/1969 | Guinot | 180/66 R |

FOREIGN PATENTS OR APPLICATIONS

| | | | |
|---|---|---|---|
| 2,009,975 | 10/1970 | Germany | 180/66 R |
| 858 | 1904 | Great Britain | 418/151 |
| 576,420 | 4/1946 | Great Britain | 180/66 R |

Primary Examiner—Kenneth H. Betts
Assistant Examiner—Milton L. Smith
Attorney—Price, Heneveld, Huizenga & Cooper

[57] ABSTRACT

The specification disclosed a hydraulic system for driving automobiles in which a separate fluid flow system is provided for the front and rear wheels respectively. Each of the drives for the front wheels and for the rear wheels includes three variable displacement pumps, one for pumping fluid and the other two each acting as a motor for one wheel. Both fluid driving pumps are driven by an internal-combustion engine. The hydraulic pumps and hydraulic motors all have counterbalanced vanes which minimize friction. A ratio control valve for each pump and each motor controls the torque to speed ratio at the vehicle wheels. A pressure equalizing valve equalizes pressure between the front and rear fluid flow systems. A bypass valve automatically short-circuits the flow of fluid through a flow system when the vehicle's engine is idling.

14 Claims, 10 Drawing Figures

INVENTOR
ALAN K. CALDWELL

ATTORNEYS

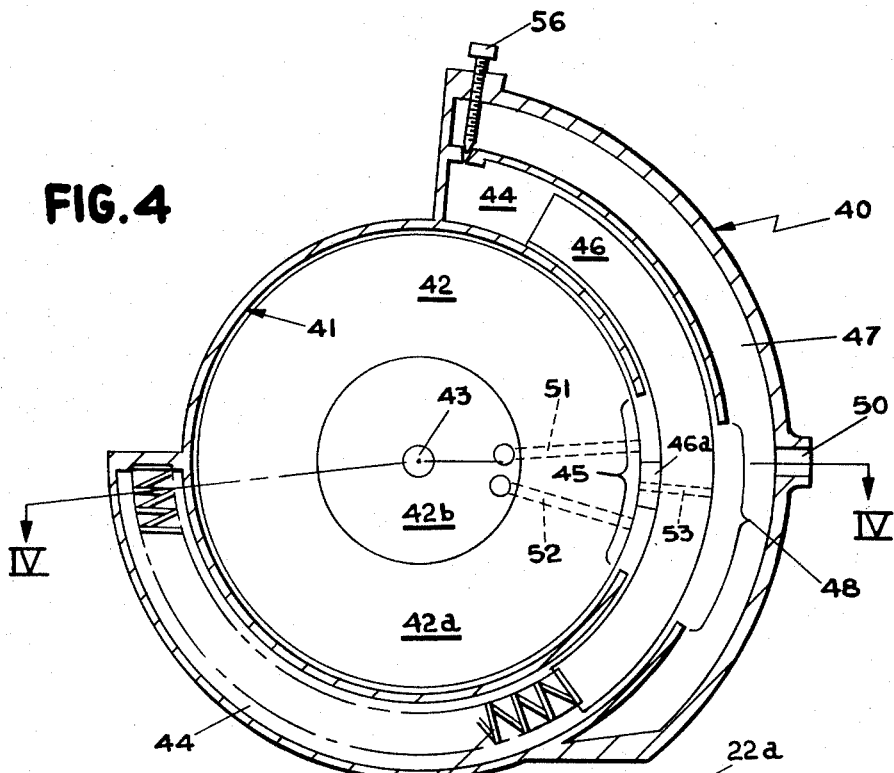
FIG. 4
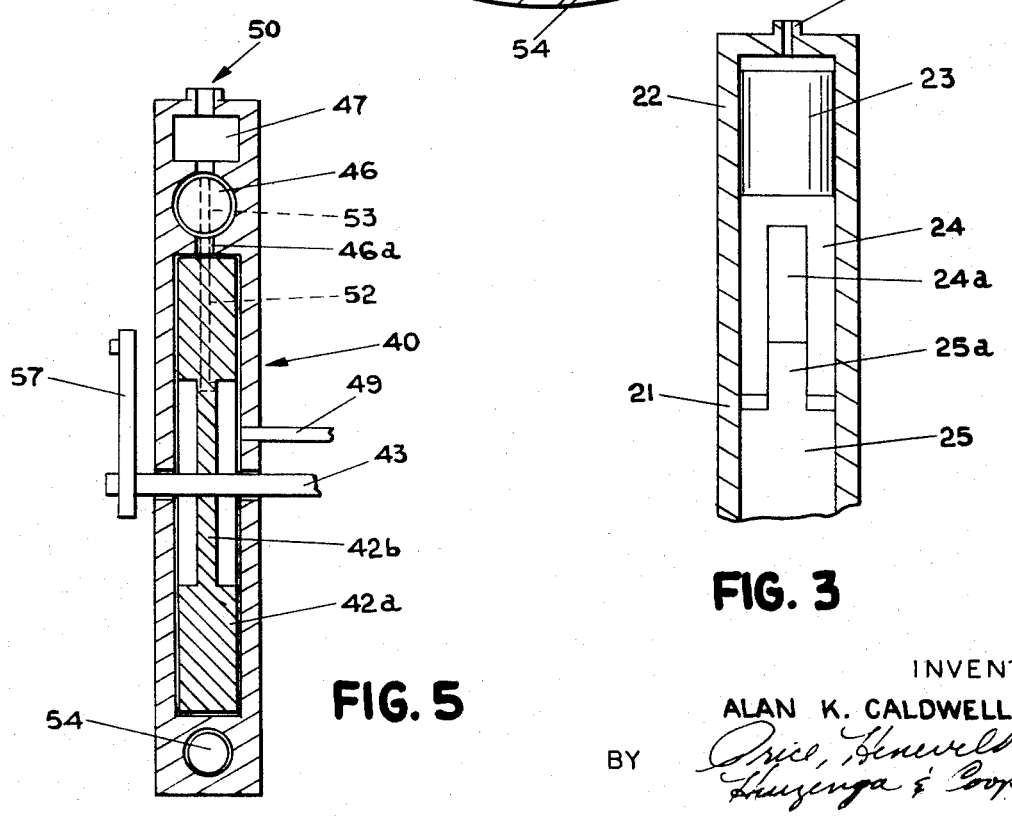
FIG. 5
FIG. 3
INVENTOR
ALAN K. CALDWELL
BY
ATTORNEYS

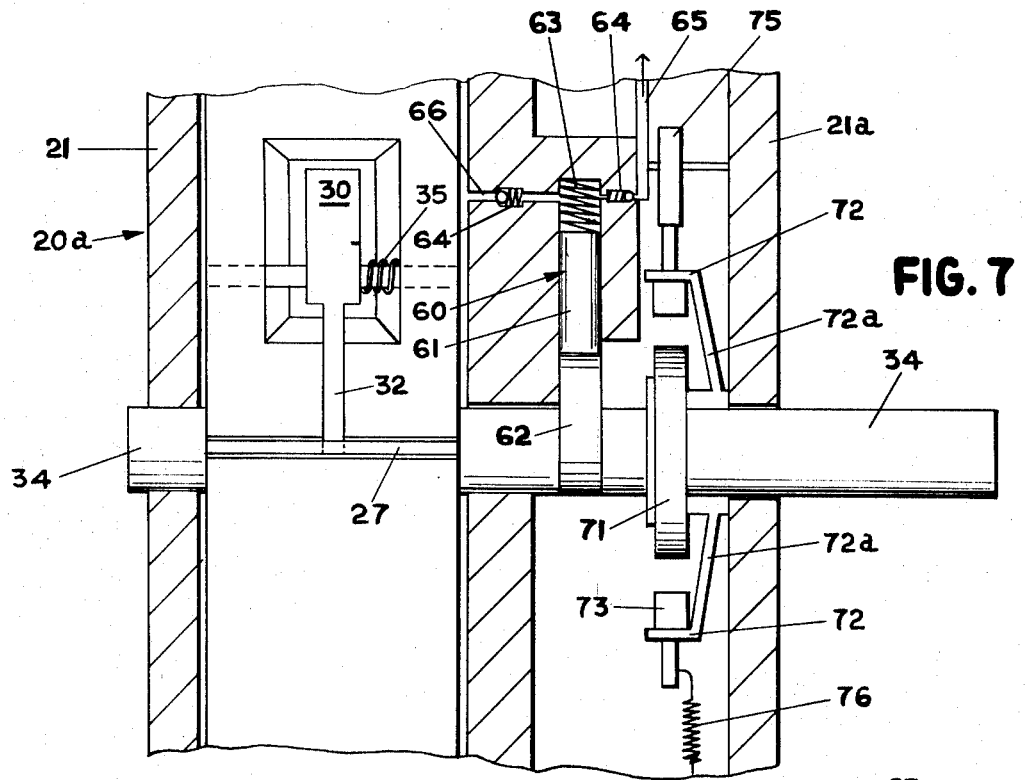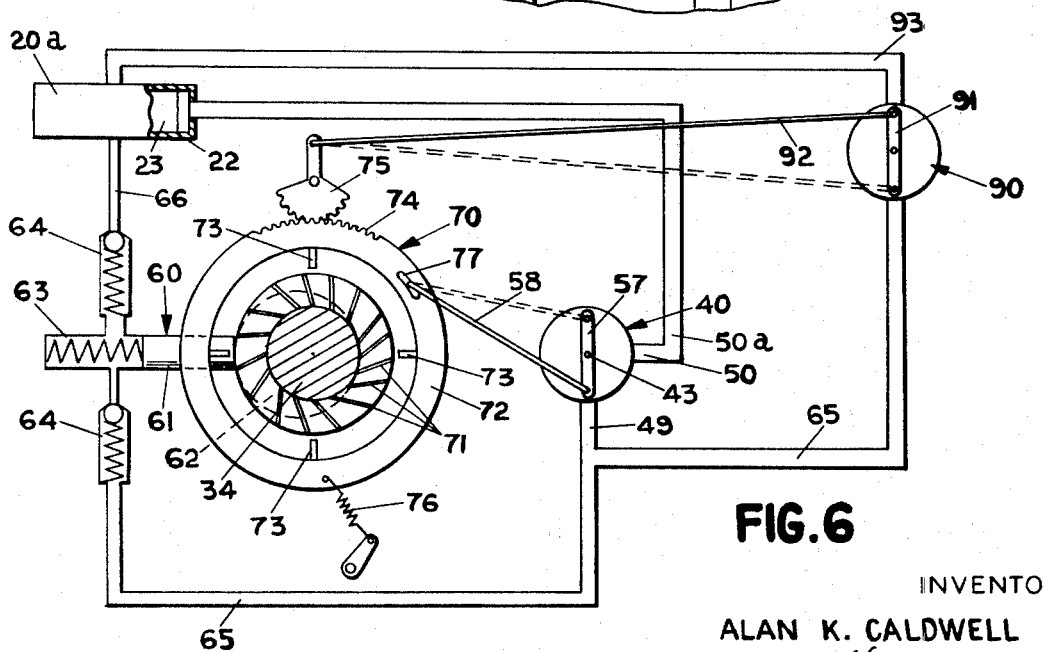

Н,724,583

HYDRAULIC MOTOR AND PUMP SYSTEM

BACKGROUND OF THE INVENTION

The present invention relates to hydraulic systems. In particular, it relates to hydraulic systems for driving wheeled vehicles. While such systems are contemplated in the prior art, none of them have achieved substantial application as would be effected if such systems were incorporated into automobiles.

Some prior art systems have no type of automatic variable transmission. Accordingly, the wheels rotate only in direct proportion to the rate of rotation of the engine. If the engine is of the internal-combustion type, it cannot be operated in its optimum range, and polluting emissions will result.

While some systems do employ variable displacement, vane-type pumps, the pumps used suffer drawbacks. The friction of the rotating vanes against the vane tracks creates considerable wear and tear. Because the vanes are free to move outwardly against the vane tracks, this wear and tear increases as the rate of rotation of the pump increases.

Other hydraulic systems suffer the drawback that if a leak were to develop, the vehicle would be stranded. While conventional power transmission systems are also subject to possible breakdown, a revolutionary new type of drive system must be almost foolproof in order to overcome consumer suspicion. Thus, the possibility of being stranded due to fluid leakage is substantially eliminated.

Yet another drawback is that in most systems, if not all, a clutch must be used in order to stop the car without turning off the engine. Thus, those who like automatic transmissions will be discouraged from purchasing vehicles with such systems.

SUMMARY OF THE INVENTION

The present invention contemplates a number of improvements over prior art hydraulic drive systems which substantially increase the applicability of fluid drive systems. This may well result in far reaching social benefits, since hydraulically driven vehicles made in accordance with this invention can be operated in conjunction with internal-combustion engines and yet can reduce the pollution emission of such engines because the engine can be operated more efficiently.

In accordance with the present invention, means are provided for driving a variable displacement, vane-type hydraulic pump. A variable displacement hydraulic motor, for at least one wheel, is then driven by the pump. Means are provided for controlling the displacement of the pump in direct proportion to the rate of rotation thereof and means are provided for controlling the displacement of the motor in inverse proportion to the rate of rotation thereof. In this manner, the torque to speed ratio of the system is greater at lower speeds than at higher speeds and the means for driving the pump can be operated in a narrower r.p.m. range than would otherwise be the case. Furthermore, where the primary driving means is an internal-combustion engine, it can be operated almost exclusively within its optimum r.p.m. range of rotation, a range which is narrower than that required to drive a vehicle using existing mechanical transmission means.

In another aspect of the invention, it is contemplated that the variable displacement pumps and motors for use in this system include counterweights mounted in the rotor of the pump or motor. These are operably connected to the vanes and the vanes are radially slidable within the rotor. These counterweights act to offset the centrifugal force acting on the vanes and thereby minimize the friction between the vanes and the vane tracks of the pump or motor.

It is also contemplated that a separate fluid drive system be provided for the front and rear wheels respectively with both systems being interconnected through a means for equalizing the pressure between the systems. If one system breaks down, the other can still be used. The use of two separate systems is made possible by the pressure equalization means since it allows the front wheels to rotate more rapidly than the rear wheels as the car turns a corner. This, of course, is a necessity in order to minimize tire wear. Further, the use of two separate systems allows one to economize by shutting one system down where the power of two would not be necessary.

Finally, the invention contemplates a system for short-circuiting the motors whereby fluid being pumped through the pump can be returned thereto through a bypass or dump line. The bypass line is opened in response to the opening of a first and second valve and is closed in response to the closing of the first valve. Means are provided for opening the first valve in response to the release of the engine accelerator and for closing the first valve in response to the depression of the engine accelerator. Means are provided for opening the second valve below a pre-selected engine speed.

BRIEF DESCRIPTION OF THE DRAWINGS

These and other objects and advantages of this invention will be seen by reference to the written specification and appended drawings wherein:

FIG. 3 is a sectional view of the pump or motor taken along plane III—III of FIG. 2;

FIG. 4 is a cross-sectional view of the ratio control valve;

FIG. 5 is a cross section of the ratio control valve taken along plane V—V of FIG. 4;

FIG. 6 is a schematic of the control elements for operating the ratio control valve;

FIG. 7 is a partially cutaway, sectional view showing the relationship between the variable displacement pump or motor and the control elements for the ratio control valve;

PREFERRED EMBODIMENT

Figure 1:
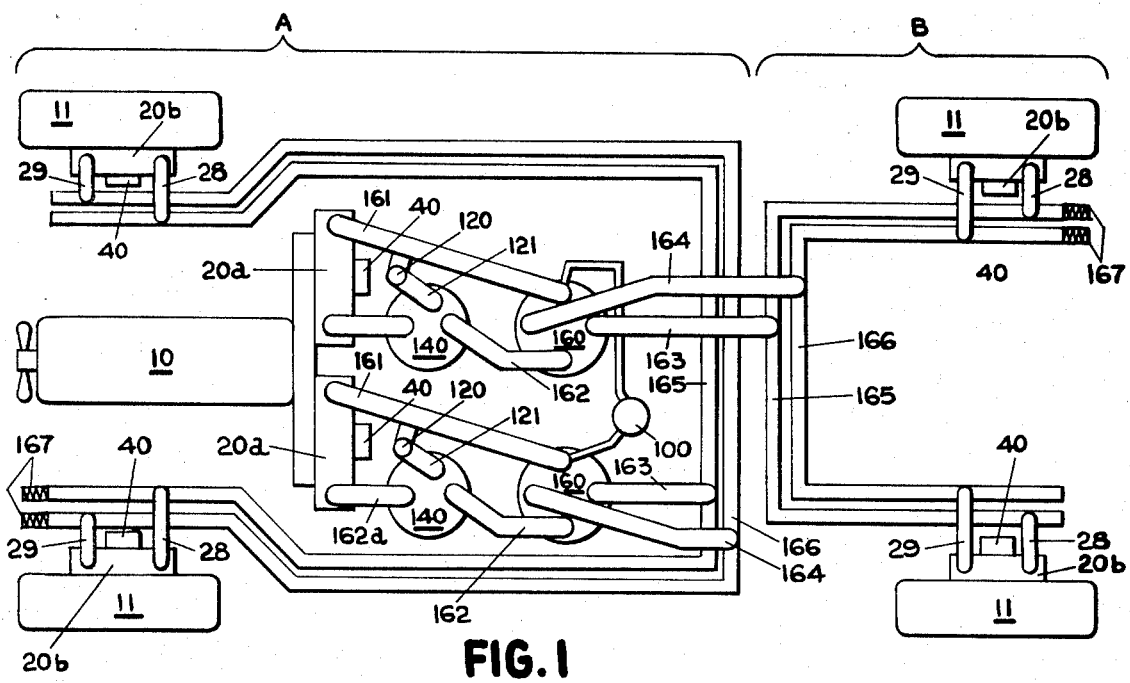
FIG. 1 is a schematic view of the hydraulic drive system.

In the preferred embodiment, the invention includes an internal-combustion engine 10 which drives a pair of hydraulic pumps 20a. The pumps 20a are each associated with an independent fluid flow system, one system A which drives the front wheels 11 and another system B which drives the rear wheels 11 (FIG. 1). In each fluid flow system, the pump 20a drives a hydraulic motor 20b associated with each wheel 11. The hydraulic motors 20b are identical to the hydraulic pumps 20a.

Figure 2:
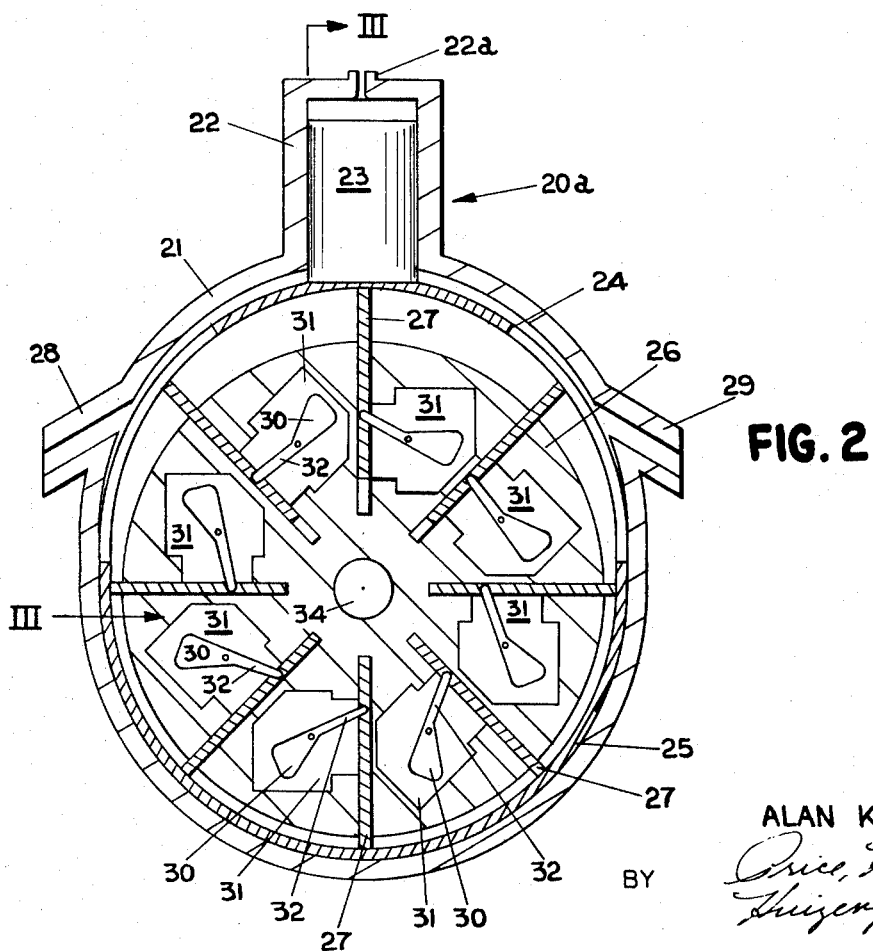
FIG. 2 is a cross-sectional view of the variable displacement hydraulic pump or motor.

The pumps 20a and motors 20b are variable displacement types. The amount of fluid being pumped, or passing through, can be varied by moving piston 23 either up or down (FIG. 2). A ratio control valve pump 60 (FIGS. 6 and 7) supplies a small amount of fluid under pressure which can be directed by a control valve 40 (FIG. 4) to the cylinder 22 of piston 23 (FIG. 6). A ratio control valve 40 and a ratio control bypass valve 90, for each pump 20a and each motor 20b, act in conjunction to control the torque to speed ratio of the system. They in turn are controlled by ratio control valve slinger 70, which in response to acceleration and deceleration, regulates ratio control valve 40 and ratio control bypass valve 90 to increase or decrease fluid pressure at cylinder 22 of piston 23. Consequently, the wheels 11 operate at a higher torque to speed ratio at lower speeds for purposes of acceleration and at a lower torque to speed ratio at higher speeds.

A pressure equalizing valve 100 is provided between the front and rear fluid flow systems in order to equalize the pressure therebetween (FIG. 1). A bypass valve 120 is provided such that the motors 20b of each fluid flow system can be short-circuited when the engine 10 is at idling speed. As is customary in such hydraulic drive systems, a fluid flow reservoir 140 and a four-way control valve 160 are provided for each fluid flow system A or B. For purposes of discussion, the specification will be divided according to the basic elements outlined above with the over-all operation of the system being described last.

PUMPS and MOTORS

The pumps 20a and the motors 20b are identical in construction and accordingly, a description of a pump 20a as shown in FIG. 2 will be sufficient. Pump 20a is a variable displacement, rotating vane-type of pump having a casing 21 and a piston chamber 22. Casing 21 is itself elliptical in cross-sectional shape. The term "variable displacement" refers to the fact that the amount of fluid pumped in a given revolution of rotor 26 can be varied. Similarly, the amount of fluid passing through a motor 20b per revolution of rotor 26 can be varied.

A circular rotor 26 is rotatably mounted within casing 21 on a shaft 34. A plurality of vanes 27 are mounted in slots in rotor 26 for radially slidable movement. In the case of pump 20a the rotation of rotor 26 causes the vanes 27 to draw fluid through an inlet 28 and force it outwardly through an outlet 29 in casing 21. Outlet 29 is in flow communication with line 161 and inlet 28 is in flow communication with line 162a (FIG. 1). In the case of a motor 20b, the flow of fluid against vanes 27 causes rotor 26 to rotate. In motor 20b, inlet 28 is in flow communication with line 165 while outlet 29 is in flow communication with line 166.

The vanes 27 ride on an upper vane track 24 and a lower vane track 25. Lower vane track 25 is stationary, but upper vane track 24 is mounted on a piston 23 which controls the relative position of vane track 24 within the interior of casing 21. Upper vane track 24 includes a slot 24a (FIG. 3) which facilitates the flow of fluid into contact with the vanes 27. Lower vane track 25 includes a projecting end 25a which mates with slot 24a such that upper track 24 is slidably guided thereby, in its vertical movements within casing 21. It is important to note that piston 23 is as wide as casing 21 and therefore that fluid is unable to pass through pump 20a except through the slots 24a. In other words, fluid is unable to flow up over the top of upper vane track 24 around piston 23.

Also mounted within rotor 26 are a plurality of counterweights 30, one for each vane 27 (FIG. 2) These are designed to offset some of the centrifugal force being exerted on vanes 27 during rotation of rotor 26. Wear of vane tracks 24 and 25 is thereby minimized. Counterweights 30 are mounted on the ends of pivoting arms 32, within hollow chamber 31 in rotor 26, such that counterweights 30 are free for swinging movement within motor 26. Counterweight 30 is operably connected to vane 27, since pivot arm 32 extends into a slot in each vane 27. The slot makes it possible for the vane 27 to move radially while the end of pivotal arm 32 moves through an arc. The moment arm of counterweight 30 on arm 32 is just slightly less than the moment arm of vane 27. A small coil spring 35 (FIG. 7) is wound about the pivot axle of arm 32 and is secured at one end to rotor 26 and at the other end to the top of counterweight 30. The difference in moment arms and spring 35 bias counterweight 30 inwardly towards the center of rotor 26 and bias vane 27 radially outwardly towards engagement with either upper track 24 or lower vane track 25.

The relative amount of displacement of pump 20a is controlled by the relative position of upper vane track 24, which in turn is controlled by the position of piston 23. A small opening 22a is provided in the top of piston chamber 22 whereby fluid can be fed under pressure to piston 23 and can thereby control the relative displacement of pump 20a. When upper vane track 24 is in its uppermost position, pump 20a pumps a high volume of fluid. When upper vane track 24 is in its lower position, pump 20a pumps much less fluid, but pumps it at a greater rate of speed. Similarly in a motor 20b, the rotor 26 is turned most rapidly when upper vane track 24 is in its lowest position. However, more power is generated for axle 34 on rotor 26 when the upper vane track 24 of a motor 20b is in its uppermost position.

RATIO CONTROL VALVE

As pointed out above, a ratio control valve 40 is provided for each motor 20b and for each pump 20a. These valves control the torque to speed ratio of the drive system. When acceleration is desired, greater torque is required. It can be achieved by increasing the displacement of motors 20b while decreasing the displacement of pumps 20a. At higher speeds, the displacement of motors 20b is decreased while that of pumps 20a is increased. These changes in displacement are controlled by the ratio control valves 40. The ratio control valves 40 make it possible to operate the vehicle over a wide range of speed while simultaneously allowing the internal-combustion engine 10 to operate within an optimum range of r.p.m. Accordingly, the internal-combustion engine 10 burns cleaner and more efficiently, resulting in less pollutant emission.

The ratio control valve 40 (see FIG. 4) includes an inner chamber 41 within which is a rotatably mounted, rotating valve element 42. It comprises a donut-like ring 42a and a narrower central web portion 42b (FIGS. 4 and 5). It is rotatably mounted on a central axle 43. It can be rotated in a clockwise or counterclockwise direction by means of controls which will be discussed infra. An intermediate chamber 44 arches around inner chamber 41 and there is a large interface opening 45 between the inner chamber 41 and intermediate chamber 44. Within intermediate chamber 44 there is a sliding valve element 46. As can be seen by reference to FIG. 5, sliding element 46 and second chamber 42 are of closely conforming, circular cross sections. An outer chamber 47 curves around intermediate chamber 44 in a manner similar to that in which intermediate chamber 44 curves around inner chamber 41. There is a large opening 48 between intermediate chamber 44 and outer chamber 47.

Inlet 49 is provided into the interior of inner chamber 41 (FIG. 5) and an outlet 50 is provided from outer chamber 47 (FIGS. 4 and 5). Flow communication can be effected between inlet 49 and outlet 50 through passages 51 or 52 in rotating valve element 42 and passage 53 in sliding valve element 46. It should be noted that the fluid can flow in either direction, i.e. from inlet 49 to outlet 50 or vice versa, depending on whether there is a positive or negative pressure differential between the two. This pressure differential is determined by the controls for ratio control valve 40 to be discussed infra.

Within rotating valve element 42, there are spaced passages 51 and 52 opening at one end in web 42b. In this manner, these passages are in flow communication with inlet 49 as is indicated in FIG. 5. These extend from the interior of inner chamber 41, through ring 42b, and out to the opening 45 between inner chamber 41 and intermediate chamber 44. There is a similar passage 53 in sliding valve element 46 which extends from the opening 48 between intermediate chamber 44 and outer chamber 47 to the opening 45 between inner chamber 41 and intermediate chamber 44. It should be noted that there is a shoulder 46a on valve element 46 which abuts snugly against rotating valve 42. Passage 53 extends through this shoulder portion 46a and when valve element 46 is in its normal position, the opening of passage 53 is oriented between the openings of passages 51 and 52. Thus, it is normally blocked because of the abutment of shoulder portion 46a against rotating valve 42.

Valve element 46 is biased towards counterclockwise sliding movement by means of a spring 54 which is mounted within intermediate chamber 44. At the other end of valve element 46, there is a small leakback passage 55 between outer chamber 47 and intermediate chamber 44. This is controlled by a metering screw 56. When the controls for ratio control valve 40 cause rotating valve element 42 to be rotated in a clockwise direction until passage 51 and passage 53 align, and when the controls cause fluid pressure to be increased at inlet 49 with respect to outlet 50, fluid will flow through passage 51, passage 53, into outer chamber 47 and out through outlet 50. However, because of increased pressure in outer chamber 47, some fluid will flow through leak-back passage 55, into intermediate chamber 44 at one end of sliding valve element 46 and will thereby force sliding valve element 46 to move in a clockwise direction. Thus, passage 53 will gradually be brought out of alignment with passage 51. This will cause the flow of fluid to stop.

If rotating valve element 42 is rotated in a counterclockwise direction until passage 52 and passage 53 align, and if pressure is decreased at inlet 49 with respect to outlet 50, fluid will flow from outlet 50, through passage 53, passage 52 and out through inlet 49. The resulting decrease in pressure in outer chamber 47 will cause fluid to flow out of intermediate chamber 44 through leak-back passage 55. This will cause spring element 54 to move sliding valve 46 in a counterclockwise direction and will cause passage 53 to move out of alignment with passage 52. In this manner, a small amount of fluid can be caused to flow from inlet 49 to outlet 50 or vice versa for a short period of time, the length of time depending on the setting of metering screw 56.

CONTROLS FOR RATIO CONTROL VALVE

In using ratio control valve 40 to control a pump 20a or motor 20b, outlet 50 is connected by means of a fluid flow line to opening 22a in piston chamber 22 of pump 20a or motor 20b (FIG. 6). The relative rotation of rotating valve element 42 and the relative pressure at inlet 49 with respect to outlet 50 are then controlled by a ratio control valve pump 60, a ratio control valve oil slinger 70 and a ratio control bypass valve 90 (FIG. 6).

Pump 60 comprises a small sliding piston 61 which is biased by a spring 63 into engagement with a cam 62 protruding from the surface of shaft 34 of pump 20a. Pump 60 is physically contained within a second casing 21a which is contiguous with casing 21 of pump 20a (FIG. 7). A small passage 66 is provided between the interior of casing 21, i.e. the interior of pump 20a, to the pumping chamber of piston 61. A pair of check valves 64 are provided on either side of the pumping chamber of piston 61 such that piston 61 acts to pump a very small amount of fluid out of the interior of casing 21 and then through a line 65 which is secured at its opposite end to inlet 49 of ratio control valve 40.

Line 65 also branches off to ratio control bypass valve 90 (FIG. 6). It is the operation of bypass valve 90 which determines whether or not the pressure applied at inlet 49 is positive or negative with respect to outlet 50. If bypass valve 90 is opened, then the pressure differential is negative since fluid flows freely through line 93 back to pump 20a. If it is closed, the pressure differential is positive.

The opening and closing of bypass valve 90, as well as the rotation of rotating valve element 42 are controlled by ratio control valve oil slinger 70 (FIGS. 6 and 7) which senses increases and decreases in rotational speed of the engine or of the wheels. Oil slinger 70 includes a plurality of slinger vanes 71 which are mounted on shaft 34 within casing 21a. For pumps 20a, the rate of rotation of shaft 34 is a function of engine speed. For motors 20b, the rate of rotation of shaft 34 is a function of vehicle speed. During the operation of pump 20a there will be at least some oil within the interior of casing 21a. By means of centrifugal force which is variable in accordance with the speed of rotation of shaft 34, slinger vanes 71 act to sling this oil outwardly away from shaft 34. A sensing ring 72 is rotatably mounted about the circumference of the slinger vanes 71. It includes a web portion 72a which extends down to shaft 34 upon which sensing ring 72 is rotatably mounted. The web portion 72a holds sensing ring 72 in position about the circumference of slinger vanes 71 (FIG. 7). Extending downwardly from the interior of sensing ring 72 are a plurality of small tabs 73 which catch the oil being slung by slinger vanes 71 and thereby cause sensing ring 72 to rotate. Sensing ring 72 is biased against such rotation by means of a spring 76.

Slinger 70 controls ratio control valve 40 by means of a control rod 58 extending from a small slot 77 in sensing ring 72 to control arm 57 which is rigidly secured to the axle 43 of rotating valve element 42 (FIG. 6). Thus, it can be seen that a clockwise rotation of sensing ring 72, which will occur when the rate of rotation of shaft 34 on pump 20a increases will cause a counterclockwise rotation of rotating valve element 42. Slot 77 allows for slight fluctuation in sensing ring 72 without affecting rotating valve element 42. When the rate of rotation of shaft 34 on pump 20a decreases, sensing ring 72 will be rotated counterclockwise by spring 76, and rotating valve element 42 will be rotated clockwise by rod 58.

Ratio control bypass valve 90 includes a control arm 91 and a control rod 92 which extends therefrom to the top of a quadrant gear 75. Quadrant gear 75 is rotatably mounted in position above sensing ring 72 and the top portion of sensing ring 72 is provided with gear teeth 74 such that rotation of sensing ring 72 in a clockwise direction results in a corresponding counterclockwise rotation of quadrant gear 75 and results in the opening of bypass valve 90, to line 93 which empties back into pump 20a (FIG. 6).

There are two essential differences between the control arrangements for a ratio control valve 40 when it is used to control a pump 20a as opposed to when it is used to control a motor 20b. When the ratio control valve 40 is being used to control a pump 20a, it is connected to sensing ring 72, as indicated above, such that when sensing ring 72 rotates in an increasing speed direction with an increase in engine speed and correspondingly in pump rotational speed, rotating valve element 42 rotates in a counterclockwise direction as viewed in FIG. 4. Similarly, control rod 92 is connected to control arm 91 of bypass valve 90 such that rotation of sensing ring 72 in the increasing speed direction results in an opening of bypass valve 90 and a decrease in pressure at inlet 49. This means that as the rotational speed of pump 20a increases due to an increase in engine speed, fluid will gradually flow from the piston chamber 22 of pump 20a and accordingly, the volume displacement of pump 20a will increase as the engine speed increases. Contrariwise, the volume displacement of pump 20a will decrease as engine speed decreases. When the ratio control valve 40 is used to control a motor 20b, the arrangement of the control rods 58 and 92 is just the opposite such that rotating valve element 42 rotates clockwise (as viewed in FIG. 4) when sensing ring 72 rotates in an increasing speed direction and bypass valve 90 closes when sensing ring 72 rotates in an increasing speed direction. In this manner, the displacement of a motor 20b decreases with increasing vehicle speed and increases with decreasing vehicle speed.

The second difference between the control arrangements for a ratio control valve 40 when it is used to control a pump 20a, rather than a motor 20b, is that spring 76 is operably connected to the accelerator for engine 10. Thus, depression of the accelerator results in a rotation of sensing ring 72 in a counterclockwise direction, thereby causing rotating valve element 42 to rotate clockwise and thereby causing ratio control bypass valve 90 to close. Thus, depression of the accelerator immediately sets the displacement of the pumps 20a at their minimum values. The spring 76 in a system associated with a motor 20b could similarly be connected to the accelerator such that depression of the accelerator would result in an immediate shift in displacement of motor 20 to its maximum value. However, it is felt that this will not be necessary and would merely result in changes in velocity which would be too abrupt upon the depression or release of the accelerator for engine 10.

PRESSURE EQUALIZING VALVE

Figure 8:
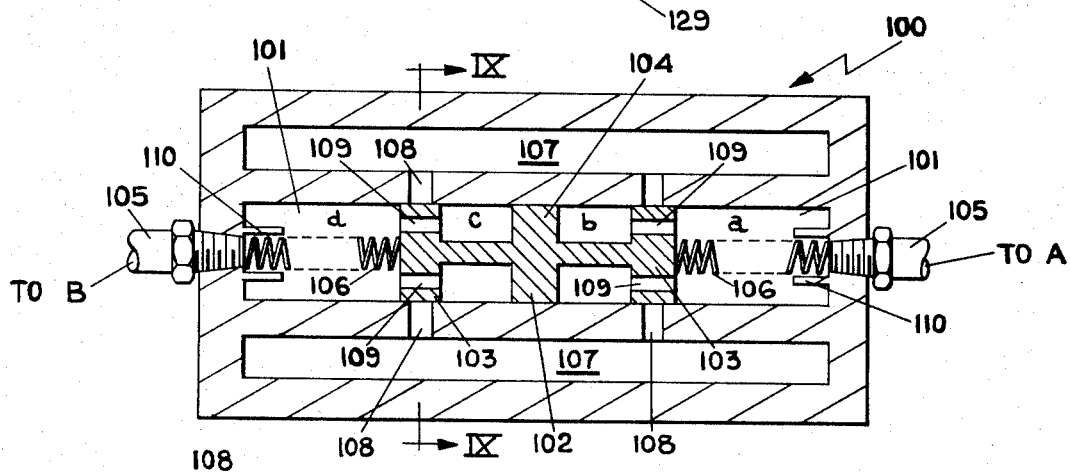
FIG. 8 is a cross-sectional view of the pressure equalizing valve.
Figure 9:
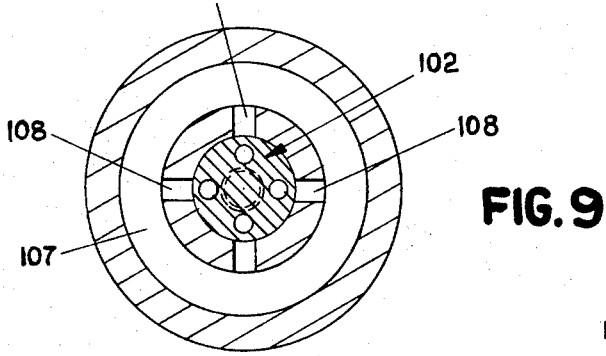
FIG. 9 is a cross-sectional view taken along plane IX—IX of FIG. 8.

Pressure equalizing valve 100 is positioned in flow communication between the front and rear hydraulic drive systems A and B (FIG. 1). It is cylindrical in shape and includes an inner chamber 101 (FIG. 8) which extends generally the length thereof. A spool 102 is mounted for slidable movement within inner chamber 101 (FIGS. 8 and 9). Spool 102 includes two identical end blocking portions 103 and a central blocking portion 104. These blocking portions divide inner chamber 101 into sub-chambers a, b, c, and d. The sub-chambers a and b are in flow communication via passages 109 extending axially through the right end blocking portion 103. The sub-chambers c and d are similarly in flow communication via passages 109 extending axially through the left end blocking portion 103. Central blocking portion 104 is solid and hence, no fluid can flow therethrough. Spool 102 is spring biased to a generally central position within inner chamber 101 by means of a spring 106 at each end thereof and extending between an end wall of inner chamber 101 and an end blocking portion 103 of spool 102. In this manner, spool 102 is normally biased to a generally central position within inner chamber 101.

There is an opening 105 into each end of inner chamber 101. One opening 105 is connected to the front fluid drive system A and the other is connected to the rear fluid drive system B. In this manner, fluid is free to communicate to the interior of inner chamber 101 from each of the fluid flow systems A and B. Inner chamber 101 is surrounded by an outer chamber 107. Inner chamber 101 and outer chamber 107 are capable of communicating through the passages 108 which extend laterally through the wall separating inner chamber 101 from outer chamber 107. However, the passages 108 are positioned such that they are blocked by spool ends 103 when spool 102 is in its normal, central position. There must be at least one passage 108 at each spool end 103. However, there may be more and in the preferred embodiment there are four such passages 108 at each spool end 103. It is important that these passages 108 be normally closed such that normally, there is no flow communication between inner chamber 101 and outer chamber 107.

In the event that the pressure in one of the fluid flow systems becomes greater than the pressure in the other, spool 102 will shift slightly to the left or right. Assuming an increase in pressure in front fluid flow system A, the passages 108 will be opened and fluid will be able to flow from sub-chamber $a$, out through passages 108, into outer chamber 107 and back through the passages 108 at the other end into sub-chamber $c$. From thence fluid will flow through passages 109, into sub-chambers $c$ and through left end opening 105 into rear fluid flow system B. Conversely, an increase in pressure in rear fluid flow system B will cause spool 102 to shift to the right. Fluid will flow from sub-chamber $d$, to outer chamber 107, to sub-chamber $b$, to sub-chamber $a$, and into front fluid flow system A. When the pressures between the front and rear systems A and B again equalize, spool 102 will return to its normal position as shown in FIG. 8.

Each biasing spring 106 is positioned directly over each opening 105. Accordingly, a short stand pipe 110 is provided which extends a short distance into the interior of inner chamber 101 at each end thereof. The length of stand pipe 110 is slightly greater than the length of spring 106 when it is fully compressed. This insures that a complete seal will be effectuated between blocking end 103 of spool 102 and opening 105 in the event that either of the front or rear fluid flow systems A or B depressurizes completely.

BYPASS VALVE

Figure 10:
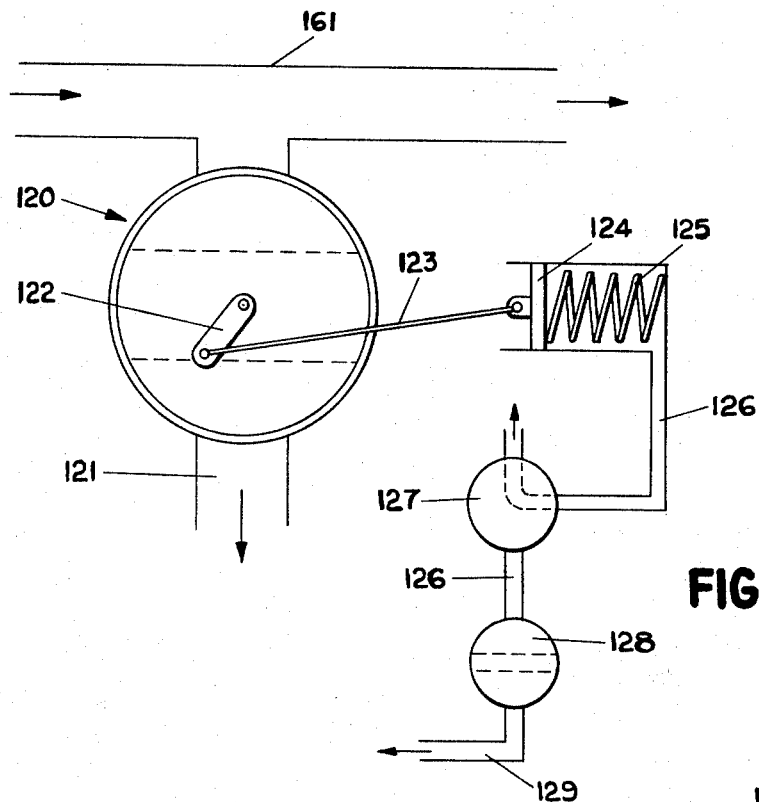
FIG. 10 is a schematic view of the bypass valve for the fluid flow systems.

There are times during the operation of a wheeled vehicle when a person will desire that the engine 10 be idling and the vehicle be stationary. Accordingly, a bypass line 121 having a bypass valve 120 thereon is provided directly from the pump supply line 161 to reservoir 140 (FIG. 1). Bypass line 121 acts to short-circuit the entire fluid flow system such that no driving fluid is delivered from pump 20a to motors 20b. Bypass valve 120 comprises a rotating valve member having a control arm 122 thereon to effectuate its rotation (FIG. 10). Control arm 122 is operably connected by a control rod 123 to a plunger 124. Plunger 124 is spring biased by means of spring 125 such that bypass valve 120 is normally closed as is shown in FIG. 10. Plunger 124 is connected to line 126 which is in flow communication with a solenoid valve 127 and a fly ball governor valve 128, both connected in series on line 126. A vacuum line 129 extends from fly ball governor valve 128 to the engine manifold vacuum. When both valves 127 and 128 are opened, vacuum is supplied to plunger 124, via lines 129 and 126, and tends to pull it against the action of spring 125 and thereby open bypass valve 120. When solenoid valve 127 closes, to block line 126, it opens to the atmosphere, thereby allowing spring 125 to again force plunger 124 to its normal position and close bypass valve 120.

Solenoid valve 127 is operated by means of a switch on the accelerator peddle for engine 10. When the accelerator is depressed, solenoid valve 127 is actuated to open to the atmosphere, thereby closing bypass valve 120 and causing fluid to be pumped from pump 20a to motors 20b. When the accelerator is released, solenoid valve 127 opens to engine manifold vacuum line 129.

However, this in and of itself does not open bypass valve 120 since valve 128 is in series with solenoid valve 127. Valve 128 is controlled by a snap-type fly ball governor which is connected to a rotating engine part which reflects the rpm of the engine. This fly ball governor might be conveniently attached to the distributor rotor. The snap-type fly ball governor is adjusted such that when the engine rpm decreases to a certain lever, valve 128 is opened. Above that preselected rpm, valve 128 will be closed and below that preselected rpm valve 128 will be opened.

Thus, if a car is idling, the valve 128 will be open and solenoid valve 127 will be open to the engine vacuum. Accordingly, bypass valve 120 will be opened and the fluid flow systems will be short-circuited. As soon as the accelerator is depressed, however, solenoid valve 127 will open to the atmosphere and bypass valve 120 will be closed. When operating at higher rates of speed, the release of the accelerator will cause solenoid valve 127 to open to the manifold vacuum. Valve 128 will still be closed, however, and the motors 20b will have the braking benefit of fluid back pressure. As soon as the engine speed decreases to a predetermined level, the snap-type fly ball governor will effectuate an opening of valve 128 and the manifold vacuum will act on plunger 124 to open bypass valve 120.

FLUID FLOW CONTROL

The vehicle direction is controlled by a conventional four-way control valve 160 (FIG. 1). There is one such valve 160 for each fluid flow system A and B, and the flow arrangement for each fluid flow system A and B is identical. Fluid is pumped by pump 20a through pump supply line 161 to four-way control valve 160. From here it flows either through a first line 163 or a second line 164 to either a first main fluid line 165 or to a second main fluid line 166 respectively. The inlets 28 are connected to lines 165 while the outlets 29 are connected to lines 166. The particular path which the fluid will follow, i.e., either through first line 163 or second line 164 depends upon the relative position of four-way control valve 160. Assuming the vehicle is to travel in a forward direction, the fluid will flow through first line 163 into first main line 165. From thence it will flow to each of the motors 20b, through the motors 20b and out through second main line 166. It will then return through second line 164, into four-way valve 160 and out through pump return line 162. Pump return line 162 empties into reservoir 140 and line 162a draws fluid from reservoir 140 into pump 20a. In the event that four-way valve 160 is adjusted to its second position, fluid will flow through second line 164 and second main flow line 166 and will return via main line 165 and first line 163. Each main line, 165 and 166 includes a shock absorber 167 at one end thereof to absorb the numerous shocks which will be caused in the system for various reasons, such as the application of brakes, sudden reversal of direction, etc. In the preferred embodiment, these shocks comprise small spring biased plungers at each end of each main flow line.

OPERATION

With the operation of the above specific components now being clearly understood, the over-all operation of the invention can be understood by conducting a series of hypothetical maneuvers. Beginning with idling, the car will be accelerated, decelerated, turned around a corner, and brought to a stop. The operation of the various components during these maneuvers will be explained.

The internal-combustion engine is initially activated and the car is running at an idling speed. Bypass valve 120 is open such that wheel motors 20b are being short-circuited. Solenoid valve 127 and valve 128 (FIG. 10) are open to the manifold vacuum. In order to initiate acceleration, the engine accelerator is depressed and solenoid valve 127 is immediately switched to the position whereby it is opened to the atmosphere. This causes spring 125 to act on plunger 124 and thereby close bypass valve 120. Fluid now begins to flow to wheel motors 20b. The depression of the accelerator also acts upon spring 76 to rotate sensing ring 72 associated with each pump 20a in a counterclockwise direction. This causes rotating valve element 42 (FIG. 4) of each ratio control valve 40 associated with each pump 20a to rotate in a clockwise direction until first passage 51 is aligned with third passage 53 in sliding valve element 46. Simultaneously, bypass valve 90 is closed, thereby effectuating a positive pressure differential at inlet 49 with respect to outlet 50. Fluid flows through passage 51 and passage 53 out through outlet 50 and into the piston chambers 22 of the pump 20a via line 50a (FIG. 6). This causes piston 23 to move downwardly and effectuates a decrease in the displacement of pumps 20a. Upper vane track 24 is moved downwardly, forcing vanes 27 radially inwardly and decreasing their pumping area. This causes pumps 20a to pump a smaller volume of fluid at a greater velocity. With the vehicle at rest, the displacement in the motors 20b is at its highest point, thus causing the fluid which is flowing from the pumps 20a at a very high velocity to exert a great deal of torque on the motors 20b and correspondingly on the wheels 11.

As the vehicle begins to accelerate, the slinger vanes 71 associated with all of the ratio control valves 40 begin to sling oil against the vanes 73 and thereby cause the sensing rings 72 to rotate in an increasing speed direction against the relative bias of springs 76. Note that this will be clockwise or counterclockwise for motors 20b depending on whether they are on the left side or right side of the car. As set forth herein, the increasing speed direction for sensing rings 72 on pumps 20a is clockwise. The rotation of sensing ring 72 in an increasing speed direction has one effect on the ratio control valves 40 associated with the pumps 20a and an opposite effect on the ratio control valves 40 associated with the motors 20b.

With respect to the pump ratio control valves, this rotation of sensing ring 72 causes rotating valve element 42 of valve 40 (FIG. 4) to rotate in a counterclockwise direction as viewed in FIG. 4 and causes ratio control bypass valve 90 to open. Passage 52 of rotating valve element 42 moves into alignment with passage 53 in sliding valve element 46. The opening of ratio control bypass valve 90 effectuates a negative pressure differential at ratio control valve inlet 49 with respect to outlet 50 by allowing fluid to return directly to the casing of pump 20a. This causes fluid to flow from piston chamber 22 of each pump 20a back through passage 53 and passage 52. Gradually, the decrease in pressure within outer chamber 47 causes fluid to leak from intermediate chamber 44 through leak-back passage 55 and thereby allow spring 54 to act upon sliding valve element 46 pushing passage 53 out of alignment with passage 52 and thereby cutting off the flow of fluid out of cylinder 22.

When the accelerator pedal is released, to initiate deceleration, the first reaction of sensing ring 72 associated with a pump 20a is to rotate in a clockwise direction due to the interconnection of spring 76 with the engine accelerator pedal. However, as the engine speed decreases, and accordingly as the rate or rotation of shaft 34 on pump 20a decreases, spring 76 begins to pull sensing ring 72 in a counterclockwise direction. This causes the above process to be repeated in reverse with a resulting decrease in the displacement of pump 20a.

On the other hand, due to the reverse arrangement of control rods 58 and 92, the ratio control valves 40 associated with motors 20b will react just the opposite. These rotating valve elements 42 will rotate in a clockwise direction and bypass valves 90 will close. This will result in the same effect as is created in the ratio control valves 40 which are associated with the pumps 20a when the engine accelerator is initially depressed. Accordingly, the relative displacement of the motors 20b will now become less and the large volume of fluid being pumped by pumps 20a will move through the motors 20b at a very rapid rate of speed, thus effectuating a high rate of rotation of wheels 11. When the vehicle begins to decelerate, the above process is repeated in reverse due to the action of the springs 76 which normally tend to pull the sensing rings 72 in a decreasing speed direction.

When the vehicle is turned around a corner, the front wheels 11 will have to rotate at a slightly faster speed than the rear wheels 11. In effect, a back pressure will be built up in the rear fluid flow system B. Assuming that the rear fluid flow system B is connected to the left side of pressure equalizing valve 100 as viewed in FIg. 8, the increase in pressure at the left end of inner chamber 101 will cause spool 102 to shift to the right. Fluid will flow from sub-chamber $d$, into outer chamber 107 through the passages 108 at the left end of the valve and back into sub-chamber $b$ through the passages 108 at the right end of the valve. From thence they will flow through the axial passages 109 in spool end blocking portion 103 and out through the opening 105 at the right end of pressure equalizing valve 100. This influx of fluid into the front fluid flow system A and out of the rear fluid flow system B will allow the rear wheels 11 to rotate more slowly than the front wheels 11 as the car is turned through a corner.

If a leak were to develop in the rear fluid flow system, then it would completely depressurize and spool 102 would shift completely to the left. The left end 103 of spool 102 would abut the left end stand pipe 110 and effectuate a seal at that point such that fluid would not be able to flow out of front fluid flow system A into the depressurized rear fluid flow system B.

In order to stop the car, the brakes can be applied and the vehicle will begin to decelerate. The shock created by the application of the brakes will be somewhat absorbed by the shock absorbers 167 in the main fluid flow lines 165 and 166. Once the foot has been removed from the accelerator, solenoid operated valve 127 will open to the manifold vacuum. However, valve 128 will remain closed until the car has decelerated such that the engine rpm's reach a predetermined low rate. At this point, the snap-type fly ball governor will cause valve 128 to open and a vacuum will be applied to plunger 124 which will then open bypass valve 120.

Throughout the vehicle operation, the pumps 20a and motors 20b are operated with a minimum of friction on the vane tracks 24 and 25. This is due to the action of counterweights 30 for each vane 27. As centrifugal force increases on a vane 27 due to increased rate of rotation of rotor 26, it is also increased on counterweight 30. Thus, the force of vane 27 against vane tracks 24 and 25 is not substantially increased with increased rotational speeds. Positive contact of vanes 27 with tracks 24 and 25 is insured by springs 35 and by the fact that the moment arm of counterweight 30 is slightly less than that of vane 27.

Thus, it can be seen that the present invention comprises a number of features which cooperate to provide a unique hydraulic drive system for wheeled vehicles. If one desired to use only one of the two fluid flow systems, a simple switching mechanism can be used to effectuate his choice. In effect, an automatic clutch is provided by the unique bypass valve 120. Automatic power transmission is provided by the unique ratio control valve 40 and its depending control elements. Pressure equalizing valve 100 provides a unique four-wheel drive differential. Finally, the unique variable displacement pump provided suffers only a minimum of wear because of the counterweighted vanes provided therefor.

It is understood that the above is merely a preferred embodiment of the invention and that many changes and alternations can be made thereof without departing from its spirit and broader aspects.

The embodiments of the invention in which an exclusive property or privilege is claimed are defined as follows.

1. A hydraulic drive system for a wheeled vehicle comprising: a hydraulic pump having a means for varying its effective displacement; means for driving said hydraulic pump; a hydraulic motor for at least one wheel, said motor having means for varying its effective displacement and being driven by said pump; said means for varying the effective displacement of said pump including control means for controlling the effective displacement of said pump in direct proportion to the rate of rotational speed thereof; said means for varying the effective displacement of said motor including control means for controlling the effective displacement of said motor in inverse proportion to the rate of rotational speed thereof, whereby the torque to speed ratio at said driven wheel is greater at lower vehicle speeds than at higher vehicle speeds; each of said variable displacement pump and motor including a piston for controlling the displacement thereof, and each of said pump controlling means and said motor controlling means comprising: a valve having first and second chambers therein; first and second valve elements movably mounted in said first and second chambers respectively; a first opening in said first chamber being in flow communication with a source of fluid; a second opening in said second chamber being in flow communication with the displacement piston of one of said variable displacement pump and variable displacement motor; an intermediate opening between said first and second chambers, said valve elements being in slidable, abutting engagement at said intermediate opening; first and second spaced passages through said first valve element in flow communication with said first chamber opening and extending to said intermediate opening; a third passage in said second valve element in flow communication with said second chamber opening and extending to said intermediate opening; the opening of said third passage at said intermediate opening being positioned between the openings of said first and second passages at said intermediate opening whereby it is normally closed because of said slidable, abutting engagement of said first and second valve elements; means for increasing the pressure at one of said first chamber opening and second chamber opening with respect to the other and for moving one of said first and second passages into alignment with said third passage to effectuate fluid flow between said fluid source and said piston; means for moving said second valve element and correspondingly said third passage out of alignment with one of said first and second passages and in the same direction in which said first valve element was originally moved to thereby again discontinue the flow of fluid between said fluid source and said piston; said valve for said pump being adjusted such that fluid flows from said fluid source to said piston during vehicle deceleration and flows from said piston to said fluid source during vehicle acceleration; said valve for said motor being adjusted such that fluid flows from said piston to said fluid source during vehicle deceleration and from said fluid source to said piston during vehicle acceleration.

2. The system of claim 2 in which said means for moving said second valve element in the same direction in which said first valve element was originally moved comprises said second valve chamber being in fluid flow communication with said second opening at one end of said second valve element, whereby changes in relative pressure at said second opening are gradually transmitted to said one end of said second valve element in said second chamber; bias means being provided at the other end of said second valve element for biasing it toward one direction of movement within said second chamber.

3. The system of claim 2 in which said means for moving said first valve element and for effectuating a pressure differential between said first and second chamber openings comprises: governor means for applying a force to said first valve element which is proportional to the rate of rotation of one of said pump and said motor; bias means being operably associated with said governor means for opposing said force applied to said governing means; pump means for said fluid source; bypass valve means associated with said fluid source and controlled by said governor for opening and closing a return line to said fluid source pump whereby the fluid pressure at said first chamber opening of said valve can be increased or decreased depending on the relative position of said bypass valve.

4. A hydraulic drive system for a wheeled vehicle comprising: a hydraulic pump having a means for varying its effective displacement, means for driving said hydraulic pump; a hydraulic motor for at least one wheel, said motor having means for varying its effective displacement and being driven by said pump; said means for varying the effective displacement of said pump including control means for controlling the effective displacement of said pump in direct proportion to the rate of rotational speed thereof; said means for varying the effective displacement of said motor including control means for controlling the effective displacement of said motor in inverse proportion to the rate of rotational speed thereof, whereby the torque to speed ratio at said driven wheel is greater at lower vehicle speeds than at higher vehicle speeds; a first fluid flow system for driving the front wheels and a second fluid flow system for driving the rear wheels of said vehicle, said first and second fluid flow systems each comprising at least one variable displacement pump and at least one variable displacement motor; means interconnecting said first and second fluid flow systems for equalizing pressure differentials which may arise therebetween during the operation of said vehicle; said means for equalizing pressure comprising a pressure equalizing valve including a first chamber and a spool mounted therein having two end portions, and a central portion around which fluid in said first chamber cannot flow; said spool being mounted for slidable movement in said first chamber; an opening into each end of said first chamber, being in flow communication with one of said two fluid flow systems; means biasing said spool toward a normal position in said first chamber; a second chamber in said pressure equalizing valve; at least one passage between said first and second chambers being positioned at each spool end when said spool is in its normal position, such that said passages are normally blocked by said spool ends; said spool being slidable in said first chamber such that upon increase in pressure in one of said fluid flow systems, said spool shifts away from said opening which is in flow communication with the increased pressure system, toward the other opening in said first chamber such that said passages between said first and second chambers are open; each end of said spool including passages extending therethrough such that when said passages between said first and second chambers are open, fluid can flow from the high pressure end of said first chamber, through said second chamber, back into said first chamber in the space between said spool end and said spool central portion and through said passages in said spool end and through said opening in said first chamber into the lower pressure system.

5. The system of claim 4 in which said spool is biased by a spring positioned at each of said ends, said openings into each end of said first chamber comprising a stand pipe extending into said chamber for a distance greater than the length of said spring when it is fully compressed such that a seal is effected by the action of said spool end pressing against the end of said stand pipe in the event that one of said two fluid flow systems completely depressurizes.

6. A hydraulic drive system for a wheeled vehicle comprising: a hydraulic pump having a means for varying its effective displacement; means for driving said hydraulic pump; a hydraulic motor for at least one wheel, said motor having means for varying its effective displacement and being driven by said pump; said means for varying the effective displacement of said pump including control means for controlling the effective displacement of said pump in direct proportion to the rate of rotational speed thereof; said means for varying the effective displacement of said motor including control means for controlling the effective displacement of said motor in inverse proportion to the rate of rotational speed thereof, whereby the torque to speed ratio at said driven wheel is greater at lower vehicle speeds than at higher vehicle speeds; each said variable displacement pump and said variable displacement motor comprising: a vane track having a movable section whereby variable displacement is achieved; a rotor carrying a plurality of vanes mounted for radially slidable movement therein, a counterweight mounted in said rotor for each of said vanes and being operably connected to said vane for offsetting the centrifugal force acting on said vane during rotation of said rotor.

7. The system of claim 6 in which said counterweight and said vane are connected through a pivoted arm; the moment arm of said vane about the pivot of said pivoted arm being slightly greater than the moment arm of said counterweight to held insure continuing contact between said vane and said track.

8. The system of claim 7 in which said pivoted arm extends into a slot in said vane and fits loosely therein whereby said vane is free to move radially within said rotor while said pivoted arm moves through an arc about its pivot point.

9. The system of claim 7 in which said counterweight and said vane are connected through a pivoted arm; bias means being operably connected to said arm for biasing said vane to movement radially outwardly whereby continuing contact between said vane and said track are insured.

10. The system of claim 6 in which said counterweight and said vane are connected through a pivoted arm; bias means being operably connected to said arm for biasing said vane to movement radially outwardly whereby continuing contact between said vane and said track are insured.

11. A hydraulic drive system for a wheeled vehicle comprising: a hydraulic pump having a means for varying its effective displacement; means for driving said hydraulic pump; a hydraulic motor for at least one wheel, said motor having means for varying its effective displacement and being driven by said pump; said means for varying the effective displacement of said pump including control means for controlling the effective displacement of said pump in direct proportion to the rate of rotational speed thereof; said means for varying the effective displacement of said motor including control means for controlling the effective displacement of said motor in inverse proportion to the rate of rotational speed thereof, whereby the torque to speed ratio at said driven wheel is greater at lower vehicle speeds than at higher vehicle speeds; a return reservoir and a bypass line to said reservoir are provided whereby the fluid pumped by said pump can be returned through said bypass line to said reservoir rather than being circulated to said motor; a bypass valve on said bypass line for opening and closing said bypass line; a vacuum line to a vacuum source; first and second valve means positioned in series on said vacuum line whereby said vacuum line is open only when both said first and second valve means are open; means for opening said first valve when said engine accelerator is released and for closing said first valve when said engine accelerator is depressed; means for opening said second valve below a preselected engine speed and for closing said second valve above said preselected engine speed; a control piston; means biasing said control piston to normally close said bypass valve; said control piston being connected to said vacuum line whereby the opening of said first and second valves causes a vacuum to act on said control piston, against said biasing means, and thereby open said bypass valve and thereby open said bypass line; said first valve acting to open said vacuum line to the atmosphere when closed, thereby allowing said biasing means to close said bypass valve and thereby close said bypass line.

12. A hydraulic drive system for a wheeled vehicle comprising: a first fluid flow system for driving the front wheels and a second fluid flow system for driving the rear wheels of said vehicle, said first and second fluid flow systems each comprising at least one variable displacement pump and at least one variable displacement motor; means interconnecting said first and second fluid flow systems for equalizing pressure differentials which may arise therebetween during the operation of said vehicle; said means for equalizing pressure comprising a pressure equalizing valve including a first chamber and a spool mounted therein having two end portions, and a central portion around which fluid in said first chamber cannot flow; said spool being mounted for slidable movement in said first chamber; an opening into each end of said first chamber, being in flow communication with one of said two fluid flow systems; means biasing said spool towards a normal position in said first chamber; a second chamber in said pressure equalizing valve; at least one passage between said first and second chambers being positioned at each spool end when said spool is in its normal position, such that said passages are normally blocked by said spool ends; said spool being slidable in said first chamber such that upon increase in pressure in one of said fluid flow systems, said spool shifts away from said opening which is in flow communication with the increased pressure system, towards the other opening in said first chamber such that said passages between said first and second chambers are open; each end of said spool including passages extending therethrough such that when said passages between said first and second chambers are open, fluid can flow from the high pressure end of said first chamber, through said second chamber, back into said first chamber in the space between said spool end and said spool central portion and through said passages in said spool end and through said opening in said first chamber into the lower pressure system.

13. The system of claim 12 in which said spool is biased by a spring positioned at each of said ends, said openings into each end of said first chamber comprising a stand pipe extending into said chamber for a distance greater than the length of said spring when it is fully compressed such that a seal is effected by the action of said spool end pressing against the end of said stand pipe in the event that one of said two fluid flow systems completely depressurizes.

14. A hydraulic system for wheeled vehicles comprising: a pump; a motor for at least one wheel being driven by said pump; a return reservoir and a bypass line to said reservoir whereby the fluid pumped by said pump can be returned through said bypass line to said reservoir rather than being circulated to said motor; a bypass valve on said bypass line for opening and closing said bypass line; a vacuum line to a vacuum source; first and second valve means positioned in series on said vacuum line whereby said vacuum line is open only when both said first and second valve means are open; means for opening said first valve when said engine accelerator is released and for closing said first valve when said engine accelerator is depressed; means for opening said second valve below a preselected engine speed and for closing said second valve above said preselected engine speed; a control piston; means biasing said control piston to normally close said bypass valve; said control piston being connected to said vacuum line whereby the opening of said first and second valves causes a vacuum to act on said control piston, against said biasing means, and thereby open said bypass valve and thereby open said bypass line; said first valve acting to open said vacuum line to the atmosphere when closed, thereby allowing said biasing means to close said bypass valve and thereby close said bypass line.

* * * * *